United States Patent [19]

Yasunaga et al.

[11] Patent Number: 4,954,698

[45] Date of Patent: Sep. 4, 1990

[54] SENSOR ALIGNING MEANS FOR OPTICAL READING APPARATUS

[75] Inventors: Yoshitaka Yasunaga; Toru Nakamura, both of Osaka, Japan

[73] Assignee: Sumitomo Electric Industries, Ltd., Osaka, Japan

[21] Appl. No.: 240,453

[22] Filed: Sep. 2, 1988

Related U.S. Application Data

[63] Continuation-in-part of Ser. No. 818,207, Jan. 13, 1986, abandoned.

[30] Foreign Application Priority Data

Jan. 14, 1985 [JP] Japan ............................ 60-3248[U]

[51] Int. Cl.⁵ .................... G06K 7/10; G06K 13/063
[52] U.S. Cl. ............................ 235/454; 235/482; 235/484
[58] Field of Search ............... 235/449, 454, 482, 483, 235/484, 485, 439, 462, 472; 360/2; 369/32; 250/569, 239, 234

[56] References Cited

U.S. PATENT DOCUMENTS

| | | | |
|---|---|---|---|
| 724,628 | 4/1903 | Thorpe | 178/110 |
| 1,929,119 | 10/1933 | Owens | 369/32 |
| 3,706,860 | 12/1972 | Burbank | 235/485 |
| 3,780,264 | 12/1973 | Kondur et al. | 235/485 |
| 3,946,438 | 3/1976 | Altmann et al. | 235/483 |
| 4,210,802 | 7/1980 | Sakai | 235/483 |
| 4,260,880 | 4/1981 | Thomas | 235/454 |
| 4,396,902 | 8/1983 | Warthan et al. | 235/485 |
| 4,457,016 | 6/1984 | Pfeffer | 235/483 |

FOREIGN PATENT DOCUMENTS

| | | |
|---|---|---|
| 2052336 | 4/1972 | Fed. Rep. of Germany . |
| 58-87661 | 5/1983 | Japan . |
| 2080004 | 6/1981 | United Kingdom . |

*Primary Examiner*—Alan Faber
*Assistant Examiner*—Robert A. Weinhardt
*Attorney, Agent, or Firm*—Cushman, Darby & Cushman

[57] ABSTRACT

An optical reading apparatus which has a mechanism for aligning the center line of the optical image sensor with the characters on the subject matter to be read. As the vertical position of the optical image sensor is adjusted, and indicator plate with a pointer which indicates the position of the center line of the optical image sensor enables alignment of the center line of the optical image sensor with the characters to be read.

4 Claims, 5 Drawing Sheets

SENSOR ALIGNING MEANS FOR OPTICAL READING APPARATUS

This is a continuation-in-part of application Ser. No. 818,207, filed Jan. 13, 1986, which was abandoned upon the filing hereof.

BACKGROUND OF THE INVENTION

This invention relates to an optical reading apparatus for optically reading characters, symbols, marks, and legends and the like carried on a recording element, and is most suitable for use in a card reader having a reading image sensor for reading the cards, checks and the like which carry the characters and the like, the reading image sensor being arranged so that its height can be adjusted while the cards, checks and the like are being moved.

Heretofore, the characters in a line could be caught within a visual field of the image sensor by manually operating the so-called "height adjustment wheels" provided for changing the height of a card track which is at the base of a card insertion slot. Upon turning the height adjustment wheels, the track height would be changed in relation to the card insertion slot by means of a helical ramp or cam, so that the different lines of characters on the cards could be accommodated irrespective of the type of the card, and the characters and the like on the card could be optically read, as shown in FIGS. 5, 6 and 9 of U.S. Pat. No. 4,396,902.

According to the aforementioned prior art, height adjustment wheels 63 are manually turned so that a track 65 is moved over its entire height on helical ramps 64, thus aligning the characters to be read with the image detector or sensor. However, it is not in fact possible to see where the center line of the image sensor is located; therefore it is difficult to properly align the center line with the characters. Moreover, the height adjustment wheels 63 are turned to raise the track 65 along the helical ramps 64 so that the adjustment wheels 63 are positioned under the track 65, which provides no means for determining whether optical array 73 in the image sensor exactly captures the character image.

SUMMARY OF THE INVENTION

The present invention is provided for solving the problem inherent in the aforementioned prior art. According to the present invention, a card insertion and deposit slot is held fast whereas a nose section of a reader means is vertically movable by means of a dial mounted on the apparatus, the dial being on the side thereof through which the card is inserted. The invention is further designed so that the center position (with respect to the vertical direction) of an image sensor for reading the card is displayed by a pointer on a position indicator plate which is preferably mounted on the same side as the dial, whereby the pointer and thus the center position of the image sensor may be aligned by eye with the center line of the characters in the line to be read to thus very readily and correctly read the characters and the like on the recording element.

The dials for vertically positioning the reader means are divided into "moving" and "locking" dials for practical use. More specifically, for each individual card, the vertical position of the reader means may be adjusted by means of the moving dial. When a plurality of the same cards are read, with the characters in a line which is a defined distance from the bottom of each card, a location is determined by the initial card which, after being fixed by the locking dial, then allows the apparatus to be subsequently used, as will be described in detail below.

The system which will be hereinafter described in detail is capable of exactly capturing the characters and the like disposed in a line by vertically moving the reader means more precisely than in the prior art. This is accomplished by providing the moving dial (as well as the locking dial), and the indicator, for showing the central position of the reader means, on the same plane on one side of the apparatus, such that the reader means may be readily aligned with the characters to be read while the operator is viewing a position where the characters are arranged in a line.

DESCRIPTION OF THE PREFERRED EMBODIMENT

Figure 1:
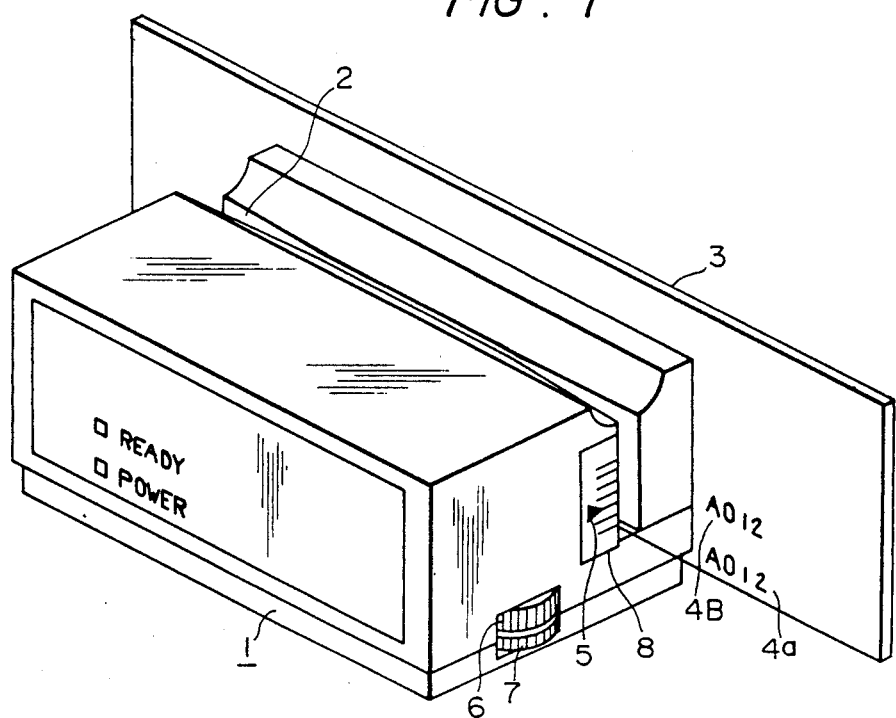
FIG. 1 is a representation schematically showing an optical reading apparatus according to the invention.
Figure 2:
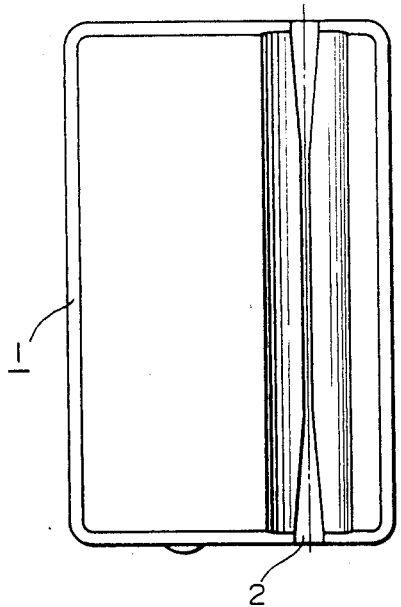
FIG. 2 is a plan view of the optical reading apparatus of the invention.
Figure 3:
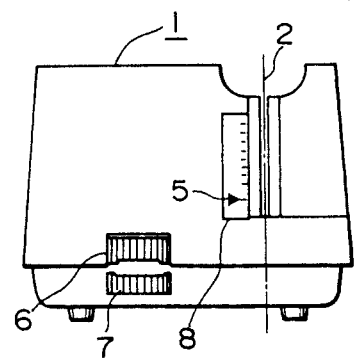
FIGS. 3 and 4 are views showing one and the other side of the instant optical reading apparatus.
Figure 4:
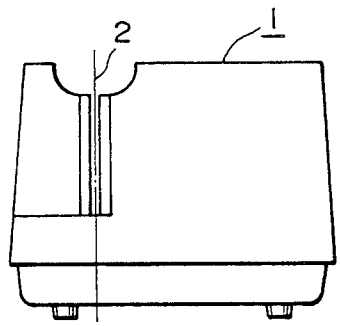
Figure 5:
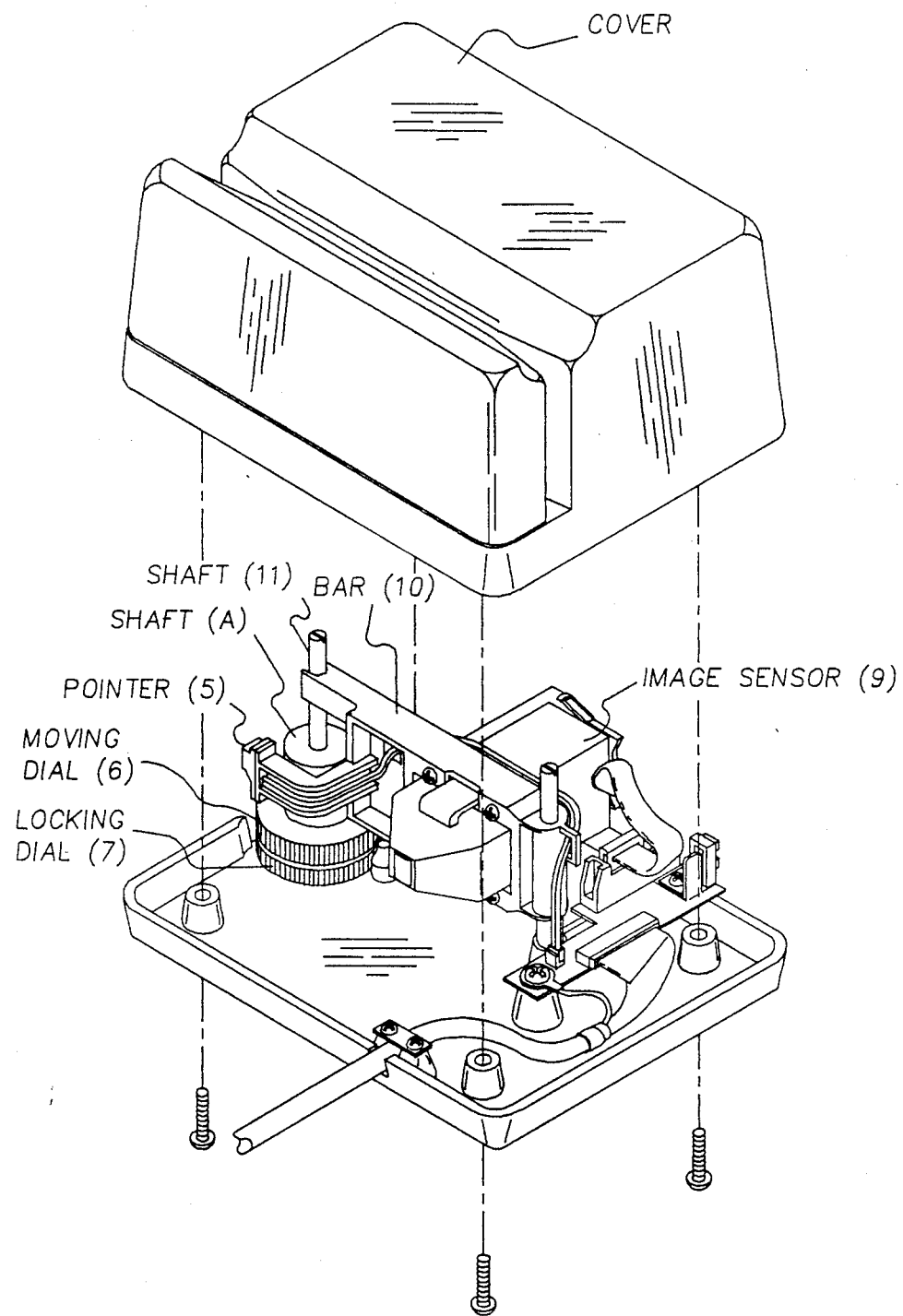
FIG. 5 is a perspective view of an optical reading apparatus when a cover is removed.
Figure 6:
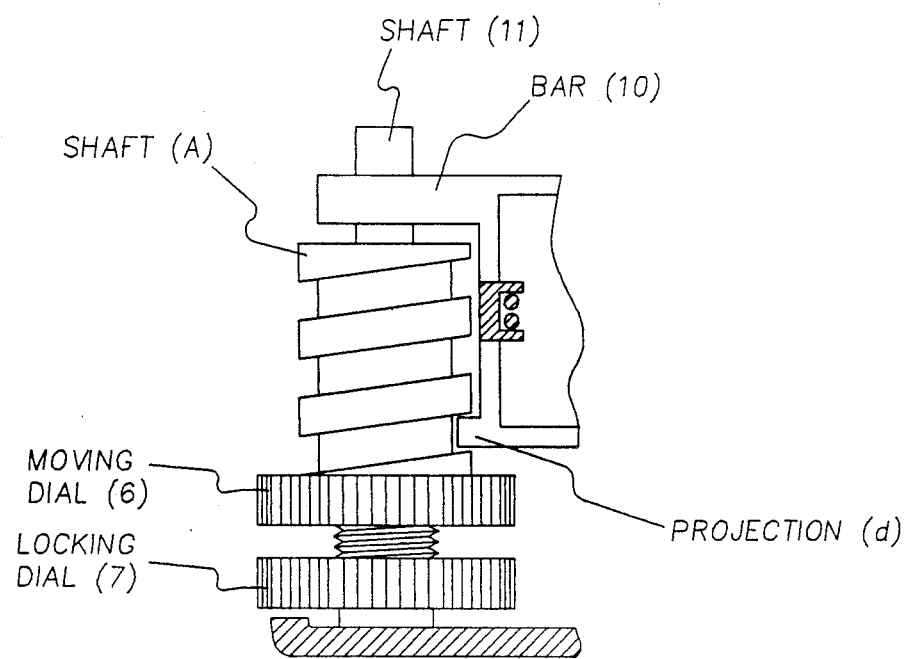
FIGS. 6 and 7 show an embodiment of the mechanism enabling the dial to move the image sensor up or down.
Figure 8:
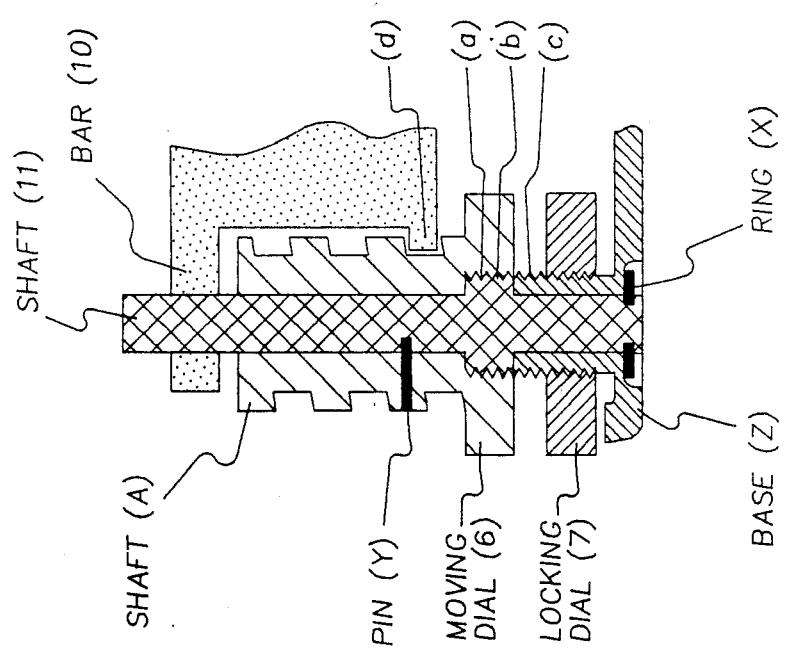
FIG. 8 is a cross-sectional view of the mechanism of FIGS. 6 and 7.
Figure 7:
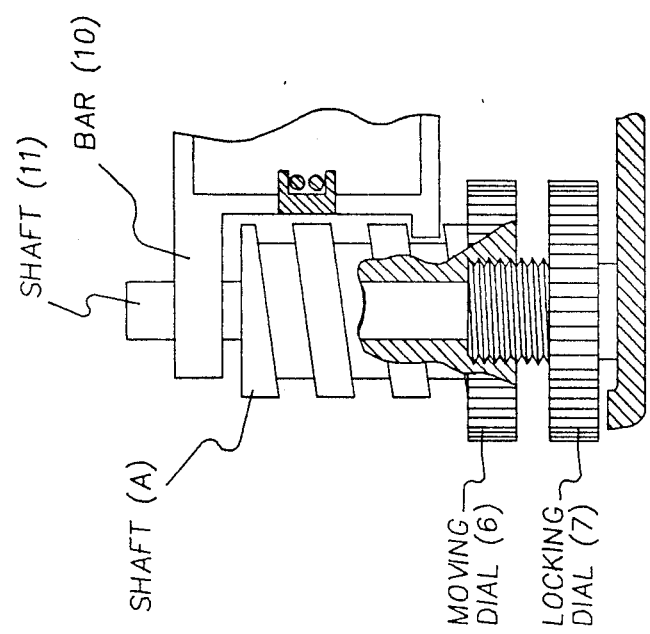

Now, an embodiment of the invention will be illustrated with reference to FIG. 1 which schematically shows an optical reading apparatus according to the present invention. A card 3 or the like is deposited or inserted in a card insertion slot 2 of an optical reading apparatus 1. For reading the characters 4a and 4b in a first or second line (hereinafter referred to as "first or second line characters 4a and 4b, respectively") as selected, a moving dial 6 for moving a portion of an image sensor (not shown) upwardly and downwardly along a light conductive path with the first and second line characters 4a and 4b, respectively, is turned manually while the user is viewing a pointer 5 in which a center position of the image sensor incorporated in the apparatus is indicated by use of luminous sources such as a lamp or LED (light emitting diode) so that the pointer 5 may be aligned with the first or second line characters 4a and 4b, respectively, which are at a defined distance from the bottom of the card. To this end, a position indicator plate 8 is provided on the apparatus as an index which serves to determine where the pointer 5, which corresponds to the center position of the image sensor, is located. That is, the position indicator plate 8 shows whether the pointer 5 is above or below the first or second line characters 4a and 4b, respectively.

If the same cards, each including a recording element which carries either the first or second line characters 4a and 4b, respectively, are repeatedly or successively used, it is convenient to bring the pointer 5 into alignment with the first or second line characters 4a and 4b, respectively, at a fixed height, then rotating a separately mounted locking dial 7 in a predetermined direction, (for example, clockwise to the very limit) to fix the readout position of the image sensor.

A mechanism for setting a position of the image sensor by the dials 6, 7 is characterized in that the position of the center of the image sensor is indicated by the pointer 5 which shows such position through a lamp or LED, and that the dials as well as the indicator are disposed in the same plane on one side of the apparatus to facilitate easy movement and alignment of the position of the image sensor.

More particularly, and referring to FIGS. 5-8, a shaft (A) has a spiral groove on the outer surface thereof and a hollow extending longitudinally on the inner surface thereof, and is integrated with a dial (6). The inner diameter of the shaft (A) is equal to the outer diameter of the shaft (11) so that the inner wall of the shaft (A) is matched to the outer wall of the shaft (11). The moving dial (6) is provided with a female screw (a) on an inner wall thereof, and the shaft (11) is provided with a male screw (b) which is formed at the outer wall of the shaft (11) to engage with the female screw (a) of the moving dial (6). The shaft (A) and the shaft (11) are temporarily fixed to each other by engaging the female screw (a) with the male screw (b), and then are constantly fixed by inserting a pin (Y) into holes formed in the shafts (A) and (11) in the traverse direction thereof. A cylinder (c) has a male screw on the outer wall thereof and a hollow receiving one side of the shaft (11), and is integrated with a base (Z). The male screw of the cylinder (c) is engaged with a female screw formed on the inner wall of the locking dial (7), so that the locking dial (7) is vertically (up and down) moved by rotating the locking dial (7). The end portion of the shaft (11) is provided with a grip and a ring (X) supported by the grip. The back surface of the base (7) is provided with a recess from which the grip is projected. The ring (X) is sandwiched between the recess and the grip through a small gap. Since the outer diameter of the ring (X) is larger than the inner diameter of the cylinder (c), the shaft (11) is not moved up above the distance corresponding the gap.

Thus, when the moving dial (6) is rotated, the shaft (A) is rotated (not moved up) and the bar (10), that is, an image sensor (9) is moved up.

When the bar (10), that is, the image sensor (9) is located at a desired position and the locking dial (7) is rotated, the locking dial (7) is moved up and contacted with the moving dial (6). The moving dial (6) and the shaft (A) are moved upwardly by the upward force of the locking dial (7), but are not moved upwardly after they are moved upward a distance corresponding to the gap. At this time, a projection (d) is fixedly contacted with a side wall of the groove of the shaft (A) and the ring (X) is fixedly contacted with the recess of the base (Z) so that the shaft (A) is not rotated.

According to the invention, the marks, symbols, characters and the like put on the cards, check or the like may be readily and correctly caught within the field of view of the sensor and are readable by operating the image sensor position setting dial and observing the pointer.

What is claimed is:

1. An apparatus for optically reading characters from any of a plurality of record media having lines of characters at different heights, comprising:
    a housing;
    means in said housing for defining a gap through which a record medium may be passed;
    optical reader means in said housing near said gap reading characters from the record medium passing through said gap;
    means for adjusting a height of said optical reader means including an adjustment dial on an outer surface of said housing; and
    means, visible from outside said housing, for indicating the height of said optical reader means, said indicating means being positioned adjacent said gap so that the indicated height of said optical reader means can readily and directly be compared to a line of characters on a portion of the record medium which extends out of said gap.

2. The apparatus according to claim 1, wherein said indicating means and said adjusting means are provided on the same side of said housing as the record medium may be inserted.

3. The apparatus according to claim 1, wherein said adjusting means further comprises a second dial, which shares a common shaft with said adjustment dial, and means attached to said adjustment dial for holding said reader means in its adjusted position by tightening said second dial so as to secure said attached means between said reader means and said second dial, said second dial being tightened by turning it on said shaft, thereby moving upward and pushing said attached means against said reader means.

4. The apparatus according to claim 1, wherein said indicating means comprises an electronic pointer formed by light emitting diodes.

* * * * *